G. PERRY.
Cultivator Teeth.
No. 102,150.  Patented April 19, 1870.
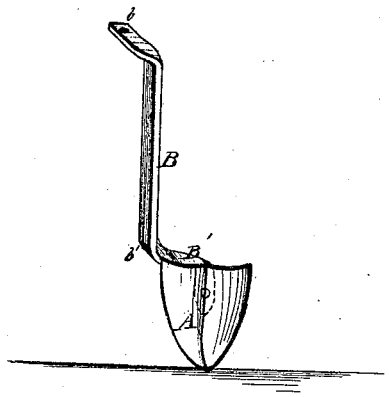
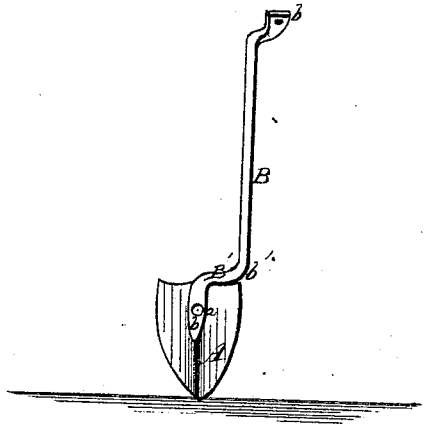

UNITED STATES PATENT OFFICE.

GEORGE PERRY, OF GRANVILLE, ILLINOIS.

IMPROVEMENT IN DOUBLE-SHOVEL PLOWS.

Specification forming part of Letters Patent No. 102,150, dated April 19, 1870.

*To all whom it may concern:*

Be it known that I, GEORGE PERRY, of Granville, in the county of Putnam and State of Illinois, have invented an Improvement in Double-Shovel Plows; and I do hereby declare that the following is a full, clear, and exact description thereof, reference being had to the annexed drawings, making part of this specification, in which—

Figure 1 is a front perspective view of a standard and shovel of a double-shovel plow or cultivator constructed on my improved plan. Fig. 2 is a rear elevation of the same.

In both figures the same letters designate identical parts.

The object of my invention is to attach the shovels of double-shovel plows or cultivators to their standards in such a manner that they can be easily scoured, and shall not be liable to become clogged with weeds, &c., whereby their efficiency is so much impaired in the plows now in common use.

To this end my improvement consists in forming upon the lower end of the standards a laterally-projecting arm, to which the shovel is secured in any approved manner, so that the earth and weeds can pass over the top of the shovels without coming in contact with their standards.

To enable those skilled in the art to make and use my invention, I will proceed to describe its construction and operation.

In the drawings, A represents the shovel, which may be of any approved construction.

B represents a standard, the upper end of which is provided, in case it be made of iron, as in the present instance, with a flange, $b$, by which it is secured to the plow-beam. At the point $b'$ the lower end is bent at a right angle to the main portion, so as to form a short arm, B'; and this arm has a flange, $b^2$, to which the shovel is to be riveted or fastened in any other approved manner.

As will be seen by reference to the drawings, the flange of the arm B' is fastened to the shovel at a point about midway between its sides, and the arm extends horizontally along the back of the shovel to its inner side, where it unites with the main vertical portion of the standard. Thus no obstruction is offered to the passage of the earth or weeds over the top of the shovel, which prevents its becoming clogged.

I have shown in the drawings only one form of construction of the standards; but this may of course be varied without departing from the principle of my invention.

Having thus described my invention, what I claim, and desire to secure by Letters Patent, is—

A cultivator tooth or shovel consisting of the standard B, constructed with flanged arm B', and shovel A, attached to said arm, substantially as and for the purpose set forth.

In testimony whereof I have signed my name to this specification in the presence of two subscribing witnesses.

GEORGE PERRY.

Witnesses:
 THOMAS WARE,
 WM. S. WARE.